March 16, 1926.  1,577,321
F. W. KURTH
TRICYCLE
Filed Jan. 28, 1925
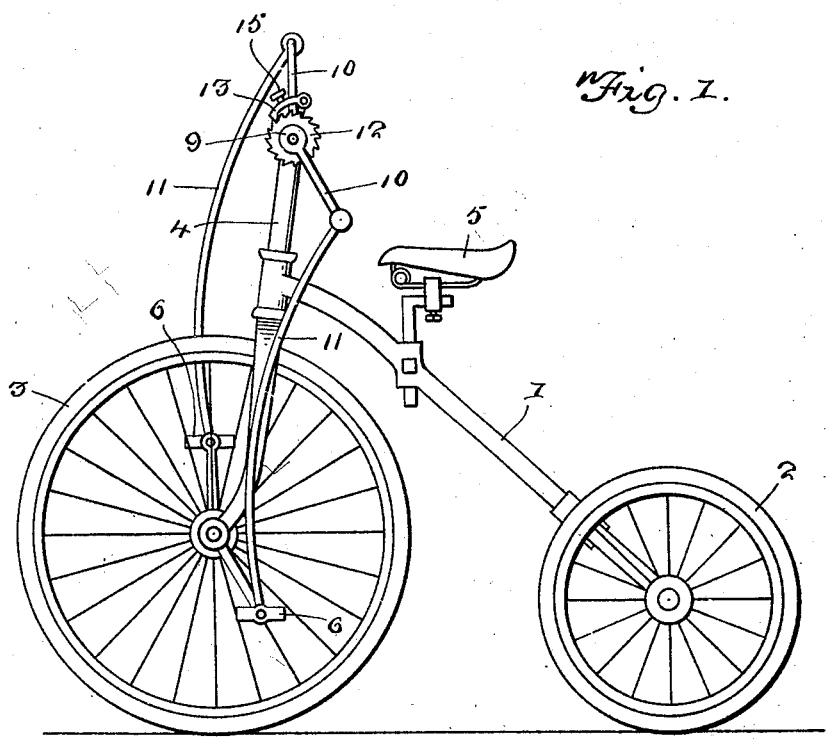
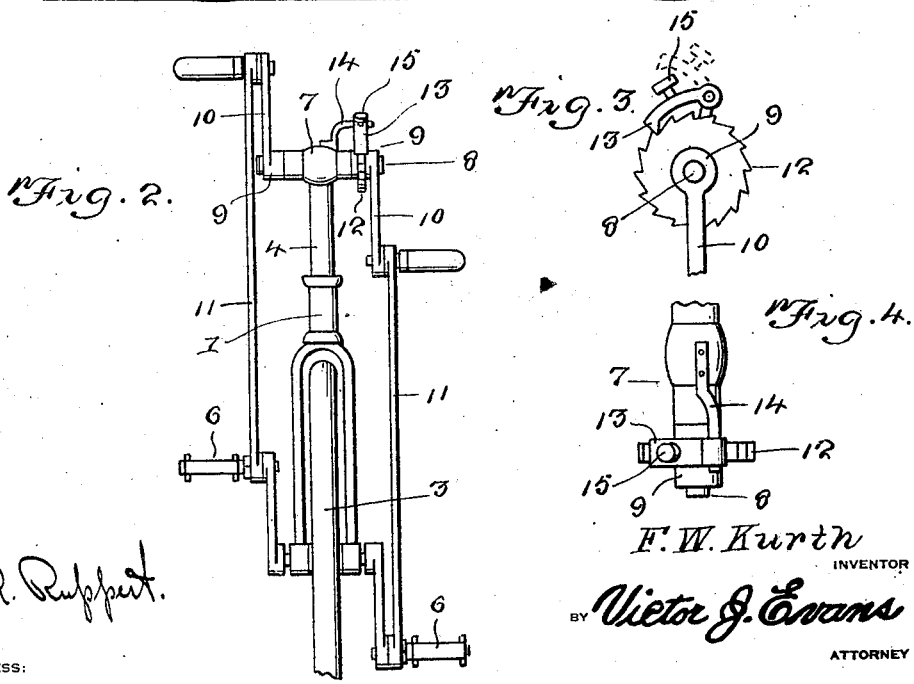

Patented Mar. 16, 1926.

1,577,321

UNITED STATES PATENT OFFICE.

FREDERICK W. KURTH, OF NEW YORK, N. Y.

TRICYCLE.

Application filed January 28, 1925. Serial No. 5,308.

*To all whom it may concern:*

Be it known that I, FREDERICK W. KURTH, a citizen of the United States, residing at New York, in the county of New York and State of New York, have invented new and useful Improvements in Tricycles, of which the following is a specification.

The invention relates to a tricycle, the general object of the invention being to provide means for propelling the device by both the hands and feet of the rider.

Another object of the invention is to provide ratchet mechanism for the device.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the device.

Figure 2 is a front view thereof.

Figures 3 and 4 are detail views of the ratchet mechanism.

In these views, 1 indicates the frame of the device which is provided with the usual rear wheels 2 and the front wheel 3 which is carried by the forked steering member 4, rotatably mounted at the front part of the frame. The frame 1 also carries an adjustable seat 5. The front wheel is provided with the usual pedals 6 and the upper end of the steering column is formed with a cross piece 7 which has at its ends the pintles 8 for the hubs 9 of the hand cranks 10. Each hand crank is connected with a pedal by a curved rod 11, the ends of the rods being pivoted to the cranks and the parts are so arranged that as one crank and pedal are on dead center the other crank and pedal will have passed dead center.

A ratchet wheel 12 is formed with the hub 9 of one of the crank handles and this ratchet wheel is adapted to be engaged by a hand operated dog 13 which is pivoted to the arm 14 on the cross piece. A finger engaging part 15 is formed on the dog so that the same can be moved manually into engagement with the ratchet wheel or disengaged from said wheel.

From the foregoing it will be seen that when the rider places his feet on the pedal and his hands on the hand cranks he can propel the cranks by both his hands and feet and at the same time use his hands to steer the device. This movement of both the hands and feet will cause the rider to exercise his entire body.

The ratchet mechanism will prevent rearward movement of the device unless the dog is raised and this mechanism will make a clicking noise when the device is in use which will act as a warning to pedestrians and thus take the place of a bell.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a frame, wheels carried by the same, a forked steering member in the frame and carrying one of the wheels, a cross piece at the upper end of the steering member, a shaft extending through the cross piece with a hand crank mounted upon each end thereof, pedals connected with the wheel carried by the steering member, a curved rod connecting each pedal with each hand crank, a ratchet wheel rotatable with one of the hand cranks, a hand operated dog pivotally supported on the cross piece and engaging with said ratchet wheel.

In testimony whereof I affix my signature.

FREDERICK W. KURTH.